UNITED STATES PATENT OFFICE.

GIORGIO LEVI, OF ROME, ITALY.

ELECTROCHEMICAL PRODUCTION OF PHOSPHATIC FERTILIZERS.

984,769.     Specification of Letters Patent.     Patented Feb. 21, 1911.

No Drawing.     Application filed August 14, 1909. Serial No. 512,850.

*To all whom it may concern:*

Be it known that I, GIORGIO LEVI, a subject of the King of Italy, and residing at No. 204 Via Nazionale, Rome, Italy, have invented certain new and useful Improvements in Processes for the Electrochemical Production of Phosphatic Fertilizers, of which the following is a specification.

This invention relates to improvements in the production of phosphatic fertilizers, the invention consisting in heating the natural insoluble phosphates of calcium with fixed oxids, silica and oxid of iron for instance, and also with other substances, such as fluxes and mineral coloring matter, the heating being conducted in an electric furnace until the whole of the phosphoric anhydrid is separated and other valuable products are obtained as fixed residues in the furnace, the former being used to make the soluble phosphatic fertilizer (which will be monocalcic phosphate). The fumes of the phosphoric anhydrid escaping from the electric furnace are dissolved in water and can be utilized either for converting further quantities of natural phosphorite into monocalcic phosphate, according to the method in use for the manufacture of the double superphosphates, (1) $Ca_3(PO_4)_2 + 2P_2O_5 + 6H_2O =$
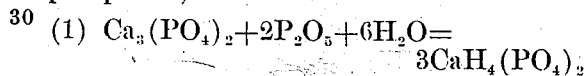
$3CaH_4(PO_4)_2$ or if the aqueous solution of same is left to rest, under convenient conditions, it is converted into orthophosphoric acid, and this acid may then be utilized for the production of its soluble salts, for instance by acting either on calcium carbonate or on lime, in the manner already known in the art, whereby industrially pure triple superphosphate or monocalcic phosphate is obtained. Besides, phosphoric acid may combine with other bases such as ammonium and potassium and thus serve as a means for fixing them and preparing a fertilizer all the constituents of which are useful for agricultural purposes. However as hitherto phosphoric anhydrid could not be obtained sufficiently cheaply, the processes above mentioned have never been generally used for industrial purposes.

Now according to the present invention the preparation of the phosphoric anhydrid is rendered convenient and profitable by means of the electric furnace, wherein from the natural tricalcic phosphate (phosphorite) phosphoric anhydrid can be directly obtained at a very low cost, or even this low cost of production can be decreased still further by arranging the process in such a manner as to leave useful by-products as residues in the furnace, without any notable increase in the working cost.

The phosphorite is subjected in the electric furnace to the action of a fixed oxid, silica for instance, which is very cheap and which, under suitable conditions, can completely displace the phosphoric anhydrid. In the electric furnace the following reaction takes place:

(2) $Ca_3(PO_4)_2 + 3SiO_2 = 3CaSiO_3 + P_2O_5$.

The calcium silicate thus formed remains in a liquid state at the bottom of the furnace, while the phosphoric anhydrid escapes in a gaseous condition and can easily be collected. Soluble silicate of sodium can be obtained as a residue instead of the silicate of calcium, by adding to the phosphorite and silica an anhydrous salt of sodium, carbonate or sulfate of sodium for instance. If sulfate of sodium is used it reacts with the silicate of calcium in the following manner (3) $CaSiO_3 + Na_2SO_4 = Na_2SiO_3 + CaSO_4$.

Instead of silica, ordinary sand and any decomposable silicate such as an alkaline feldspar can be used.

Although the reaction (2) can take place in any type of electric furnace, provided that it is furnished with a hood for the collection of the gaseous products, whether it be with continuous or alternating current, arc or resistance, it is well to observe that, if in the reacting mass there is a reducing agent such as carbon, it may reduce the phosphoric anhydrid to phosphorous, a result which would be a sheer loss of energy. It will therefore be preferable (although not an indispensable condition, since also when phosphorous is produced in the chamber of the furnace it may be oxidized in another part of the apparatus) to have a furnace of that class where the reacting mass does not come into contact with carbon, nor with the carbon electrodes, but is brought to the desired temperature by radiation or by heating the outside wall of the chamber of the furnace, as in certain resistance furnaces. Besides when mineral colors must be obtained in the manner described hereinafter the reaction shall take place in an oxidizing medium, that is in the presence of an excess of oxygen, and the carbon would therefore have a disturbing action. Further by adding to the reacting mass certain oxids or metallic salts, valuable mineral colors can be obtained. Thus, if silicic acid, oxid of cobalt and anhydrous sodium sulfate are added to the phosphorite, the fixed residue in the furnace, after the vaporization of the phosphoric anhydrid, will be the so-called Saxony blue. This enamel color is not properly speaking a definite chemical compound. It is rather a mixture of a double silicate of sodium and calcium with oxid of cobalt, to which certain authors assign the formula (4) $(Na_2CaSiO_3)_3 + 3C_0O$.

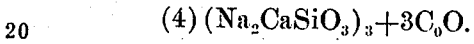

As a fixed oxid, oxid of iron can be used instead of silica. For instance a mixture of phosphorite, anhydrous sulfate of sodium and iron oxid ($Fe_2O_3$) will produce the development of the phosphoric anhydrid and leave as residue a mixture of oxids of calcium, sodium and iron; the sulfate of sodium acting in this case as a flux.

The phosphoric anhydrid is thus obtained economically (an essential condition for competing successfully with the methods now in use for the acidification of phosphorites) for the following reasons: (a). The consumption of energy is only that strictly necessary. (b). On account of the peculiar conditions of the process it is not necessary that the phosphorite should be very finely ground—an expensive operation frequently essential in other methods. (c). The electrodes are burned away very slowly, since they have only to carry the current, and do not take part in the chemical reaction which causes the production of phosphoric anhydrid. The by-product silicate of calcium (which will be of varying composition according to the phosphorites employed and according to the temperature attained) may be used as material for cement or for glassmaking, and will have an appreciable market value, and the soluble silicate and the mineral colors have a still higher value. (d). Finally, the reagent $SiO_2$, by means of which the phosphoric anhydrid is freed, is very cheap and is found almost everywhere.

I claim:

1. The process for the industrial preparation of phosphatic fertilizers, which comprises heating in an electric furnace a mixture comprising natural tricalcic phosphate, a fixed oxid capable of displacing at high temperature the phosphoric anhydrid contained in the tricalcic phosphate and in quantity sufficient to displace all of said phosphoric anhydrid, and an anhydrous salt of sodium, and maintaining the heating of the mass until all the phosphoric anhydrid has been separated and the residue consists of molten oxid-containing material, substantially as described.

2. The process for the industrial preparation of phosphatic fertilizers, which comprises heating in an electric furnace natural tricalcic phosphate mixed with silica in quantity sufficient to displace all the phosphoric anhydrid and an anhydrous salt of sodium, and maintaining the heating of the mass until all the phosphoric anhydrid has been separated and the residue consists of molten soluble silicate of sodium, substantially as described.

3. The process for the industrial preparation of phosphatic fertilizers, which consists in heating in an electric furnace natural tricalcic phosphate, silica in sufficient quantity to displace all the phosphoric anhydrid, a salt of sodium and a coloring metallic salt, and maintaining the heating of the mass until all the phosphoric anhydrid has been separated and the residue consists of the enamel color corresponding to the salt employed, substantially as described.

4. The process for the industrial preparation of phosphatic fertilizers, which consists in heating in an electric furnace natural tricalcic phosphate, silica in sufficient quantity to displace all the phosphoric anhydrid, anhydrous sodium sulfate, and oxid of cobalt, and maintaining the heating of the mass until all the phosphoric anhydrid has been separated and the residue consists of Saxony blue, substantially as described.

In witness whereof I have hereunto set my hand in presence of two witnesses.

GIORGIO LEVI.

Witnesses:
LETTERIO LABOCCETTA,
ANTONIO LABOCCETTA.